United States Patent [19]

Wood

[11] Patent Number: 4,836,715
[45] Date of Patent: Jun. 6, 1989

[54] PASSAGEWAY LINING MATERIAL

[75] Inventor: Eric Wood, Castletown, United Kingdom

[73] Assignee: Insituform International N.V., Curacao, Netherlands Antilles

[21] Appl. No.: 13,590

[22] Filed: Feb. 11, 1987

[51] Int. Cl.⁴ .................. E21D 11/00; E02B 9/06; F16L 55/10; F16L 55/16

[52] U.S. Cl. .................... 405/150; 405/155; 138/98; 428/36.3; 428/36.4; 156/294

[58] Field of Search .............. 405/150, 155; 138/97, 138/98, DIG. 2; 428/36; 156/71, 294

[56] References Cited

U.S. PATENT DOCUMENTS

| | | | |
|---|---|---|---|
| Re. 27,144 | 6/1971 | Rubenstein | 405/155 X |
| 2,794,758 | 6/1957 | Harper | 156/286 |
| 3,250,654 | 5/1966 | Rubenstein | 405/155 X |
| 3,340,115 | 9/1967 | Rubenstein | 156/86 |
| 3,412,891 | 11/1968 | Bastone et al. | 220/83 |
| 3,424,203 | 1/1969 | Rubenstein | 156/86 X |
| 3,511,734 | 5/1970 | Darrow | 156/287 |
| 3,960,644 | 6/1976 | McFadden | 156/390 |
| 3,996,967 | 12/1976 | Takada | 138/97 |
| 4,035,543 | 7/1977 | Draper et al. | 428/245 |
| 4,064,211 | 12/1977 | Wood | 405/150 X |
| 4,104,095 | 8/1978 | Shaw | 138/DIG. 2 X |
| 4,289,172 | 9/1981 | Ekstrom | 138/DIG. 2 X |
| 4,350,548 | 9/1982 | Zenbayashi et al. | 156/156 |
| 4,386,628 | 6/1983 | Stanley | 138/97 |
| 4,390,574 | 6/1983 | Wood | 428/36 |
| 4,456,401 | 6/1984 | Williams | 405/150 |
| 4,600,615 | 7/1986 | Hyodo et al. | 428/36 |
| 4,627,472 | 12/1986 | Goettler et al. | 428/36 X |
| 4,670,315 | 6/1987 | Hillemeier et al. | 138/DIG. 2 X |
| 4,681,783 | 7/1987 | Hyodo et al. | 428/36 |
| 4,684,556 | 8/1987 | Ohtsuga et al. | 428/36 |
| 4,686,126 | 8/1987 | Hyodo et al. | 428/36 |
| 4,688,605 | 8/1987 | Eisenzimmer et al. | 138/DIG. 2 X |
| 4,723,579 | 2/1988 | Hyodo et al. | 138/97 X |

FOREIGN PATENT DOCUMENTS 2842530  4/1979  Fed. Rep. of Germany ... 138/DIG. 2

Primary Examiner—Randolph A. Reese
Assistant Examiner—John A. Ricci
Attorney, Agent, or Firm—James & Franklin

[57] ABSTRACT

The tensile strength, and particularly the ability to resist changes in cross-sectional configuration, of a rigidifiable-in-situ passageway lining material comprising a fibrous body with a settable resin forming a part thereof, the fibers in that fibrous body having their lengths generally extending transversely to the plane thereof, is enhanced by incorporating thereinto a reinforcing layer formed of fibers with their lengths generally extending in the plane of the lining, and preferably circumferentially when the lining defines a tube. A pair of such reinforcing layers may be provided, each near a different surface of the lining, thereby to simultaneously protect against buckling and ovality.

8 Claims, 3 Drawing Sheets

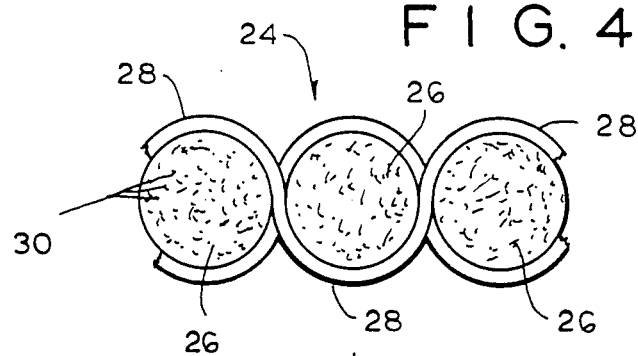
FIG. 4
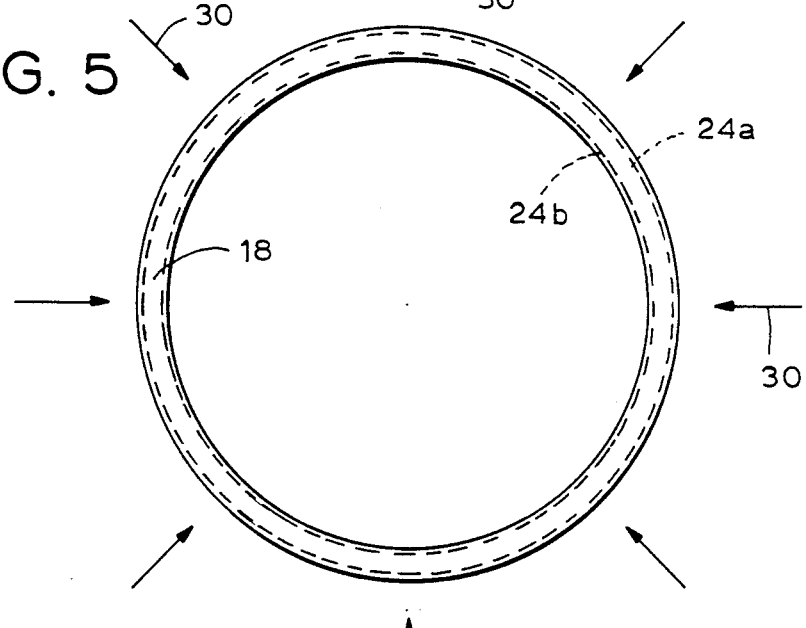
FIG. 5
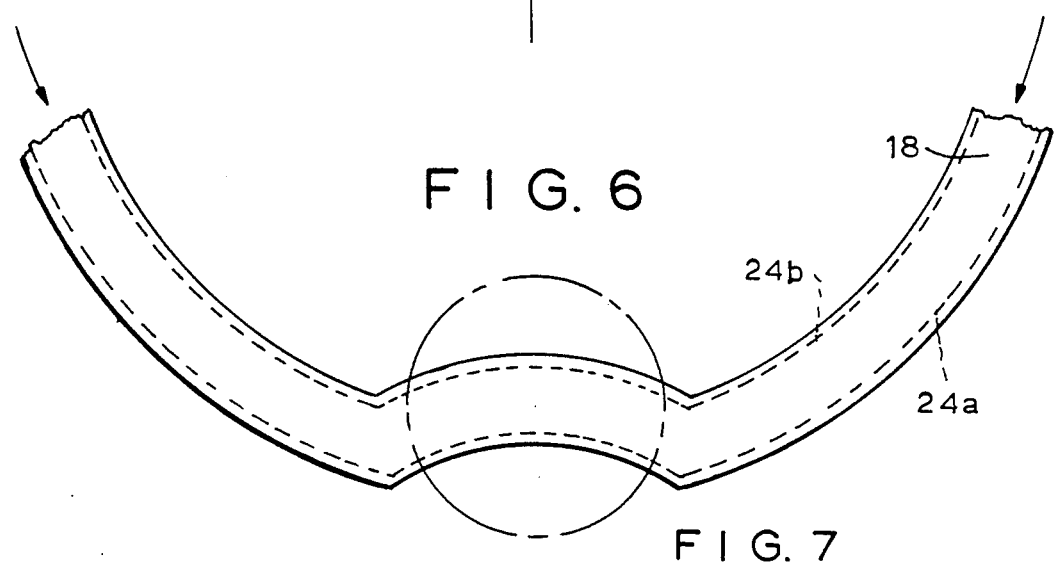
FIG. 6
FIG. 7

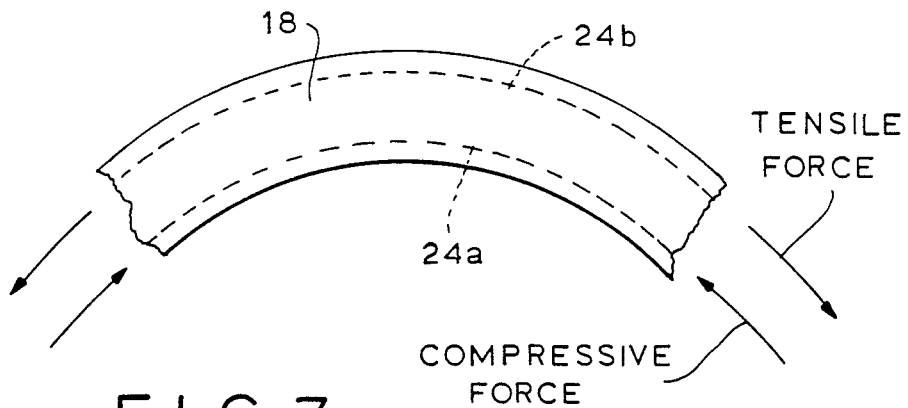
FIG. 7
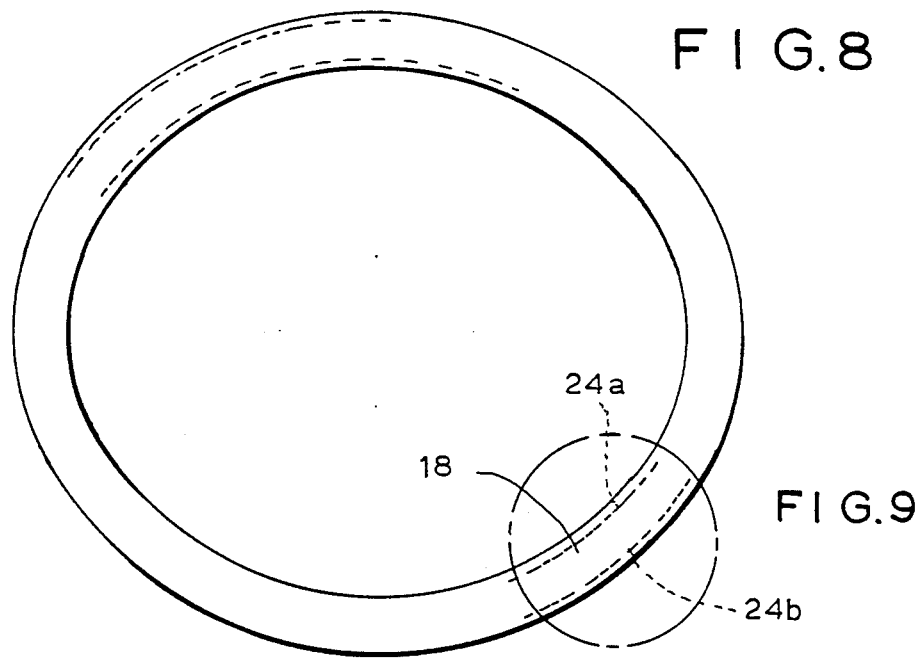
FIG. 8
FIG. 9
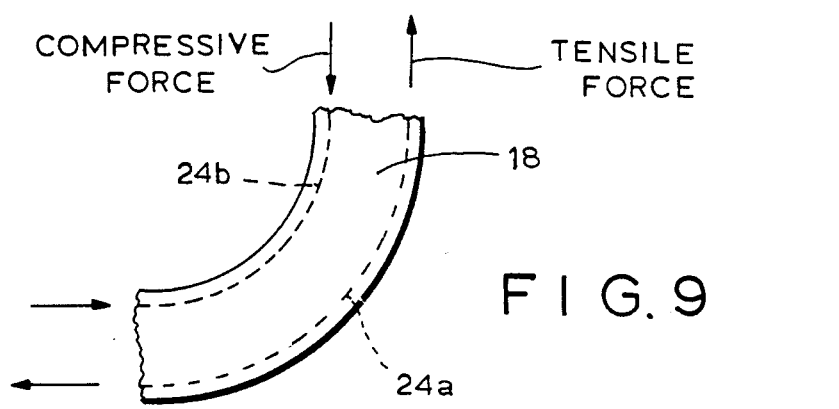
FIG. 9

PASSAGEWAY LINING MATERIAL

The present invention relates to a rigidifiable-in-situ conduit lining which is reinforced in a fashion which significantly increases its tensile strength and in particular significantly protects against buckling or ovality.

Pipelines and other passageways need repair or replacement as they age. Replacement, particularly of underground pipelines and passageways, is extremely costly. Accordingly it is becoming increasingly common to provide linings for such pipelines and passageways while those structures remain in place. Various types of lining have been provided, some flexible, some rigid and some flexible when applied but rigidifying after application, but in all cases it is preferable that the lining be of a nature such that it closely conforms to and engages the inner surface of the pipeline or passageway. With linings that are flexible either permanently or initially, that conformity to and engagement with the internal surface of the pipe (the term "pipe" is here used generically to include all types of pipelines or passageways) is accomplished by internally pressurizing the lining.

In one widely practiced method of lining pipes, certain aspects of which are disclosed in Wood Pat. No. 4,064,211 of Dec. 20, 1977 entitled "Lining of Passageways", flexible lining tubes are utilized. These tubes comprise a resin-absorbent material which serves to soak up a curable synthetic resin. The resin-impregnated tube, initially flexible, is inserted into the pipe and then forced radially outwardly into engagement with the internal pipe surface by internally pressurizing the flexible tube by means of pneumatic or hydraulic pressure, with or without providing a vacuum in the initial space between the tube and the pipe. After that internal pressurization, the resin with which the tube is impregnated cures, thus producing a rigid lining within the pipe which ideally closely conforms to the entire inner surface of the pipe.

A particularly suitable resin-absorbent material is felt, and in particular a needled felt of polyester or acrylic fibers. Such a product is inexpensive and readily available, it readily absorbs the curable resin, and it is of a specific gravity such as to be adapted for use in connection with the use of liquid (usually water) to insert the lining in the pipe to be repaired and hold it in position while the resin is setting, as described in said Wood Pat. No. 4,064,211. However, those linings when in the cured, hard state do not exhibit the best characteristics of resistance to changes in tubular cross-section, such as buckling or ovality. It is believed that this is due to the fact that the needled felts in question are manufactured from short, discrete fibers which are heavily needled so that the fibers by and large extend in a direction at right angles to the plane of the material.

There are known absorbent fabric materials in which the fibers lie in the main in the plane of the material and which therefore have a significantly higher tensile strength than the heavily needled felts presently used in the lining processes under discussion. One example of such material is a lightly needled continuous fiber mat. However, such materials are considerably more costly than the heavily needled felts, and in many instances present other difficulties (absorbency, specific gravity, ease of manipulation, etc.) which militate against their use for pipe lining.

When linings of the type under discussion have been formed and hardened in situ the lining becomes a hard shell impermeable to gas and liquid, thereby repairing or rehabilitating the pipe in which it is formed. That hard lining has sufficient strength to be self-sustaining under normal circumstances. However, such linings are often formed in underground passageways located well under the subsurface water table, or in pipes otherwise subjected to significant external pressure, and if that pressure is sufficiently great to overcome the tensile strength of the lining, the tube formed by the lining may change in shape, and this will in turn adversely affect its fluid integrity. Two types of such distortion are particularly prevalent. In one, a section of the lining buckles inwardly, and in another the cross-sectional shape of the lining, optimally circular, flattens somewhat to become oval. Not only do these shape changes tend to adversely affect the fluid integrity of the lining, but they also involve a portion of the lining separating from the pipe to be lined, producing a space which, undesirably, can fill with external fluid.

The primary object of the present invention is to provide a lining material which is essentially as well adapted to use in the lining process under discussion as the linings heretofore used in that connection, but which will produce a hardened lining of significantly greater tensile strength than heretofore, and one which is significantly more resistant to shape changes such as buckling and ovality.

A further object of the present invention is to devise such a lining material which is essentially no more costly and no more difficult to manipulate in the lining process than the prior art lining materials.

To those ends the basic construction of the lining material may be essentially the same as that previously employed, being constituted by a primary layer made up of felted fibers which in the main extend transversely to the plane of the layer. The lining material of the present invention also includes one or more reinforcing layers made up of fibers lying in the main in the plane of the layer, the reinforcing layer being suitably bonded to the primary layer. The fibers of the reinforcing layer are of substantial tensile strength and may be provided in the form of a fabric in which those in-the-plane fibers are held together in proper orientation and, preferably, are of appreciable length. In this way the reinforcing layers will themselves be self-sustaining, so that they can be readily handled in the course of incorporating them into the overall lining. The location of the reinforcing layer within the lining may vary depending upon the particular problem to be resisted, a reinforcing layer located close to the outer surface of a tubular lining serving to inhibit ovality and a reinforcing layer located close to the inner surface of the tubular lining serving to inhibit buckling. In many instances the lining may be subjected to both ovality and buckling tendencies, in which case a pair of reinforcing layers can be employed, one close to the outer surface and the other close to the inner surface of the tubular lining.

To the accomplishment of the above, and to such other objects as may hereinafter appear, the present invention relates to a reinforced conduit lining rigidifiable in situ, as defined in the appended claims and as described in this specification, taken together with the accompanying drawings, in which:

FIG. 1 is a diagrammatic cross-sectional view illustrating the pipe lining disclosed in U.S. pat. No.

4,064,211, utilizing a flexible lining which is pressed into engagement with the pipe inner surface and cured;

FIG. 4 is an enlarged cross-sectional view of the sheet of FIG. 3, taken along the line 4—4 of FIG. 3;

FIG. 5 is a schematic end view of a tubular lining of the present invention;

FIG. 6 is an enlarged schematic view of a segment of the lining of FIG. 5 which has been caused to buckle, and FIG. 7 is a further enlarged view of of the buckled portion thereof; and FIG. 8 is an enlarged schematic view of a segment of the lining of FIG. 5 which has been distorted to become oval rather than circular, and FIG. 9 is a further enlarged view of a segment of a portion of the oval-shaped lining.

Figure 1:
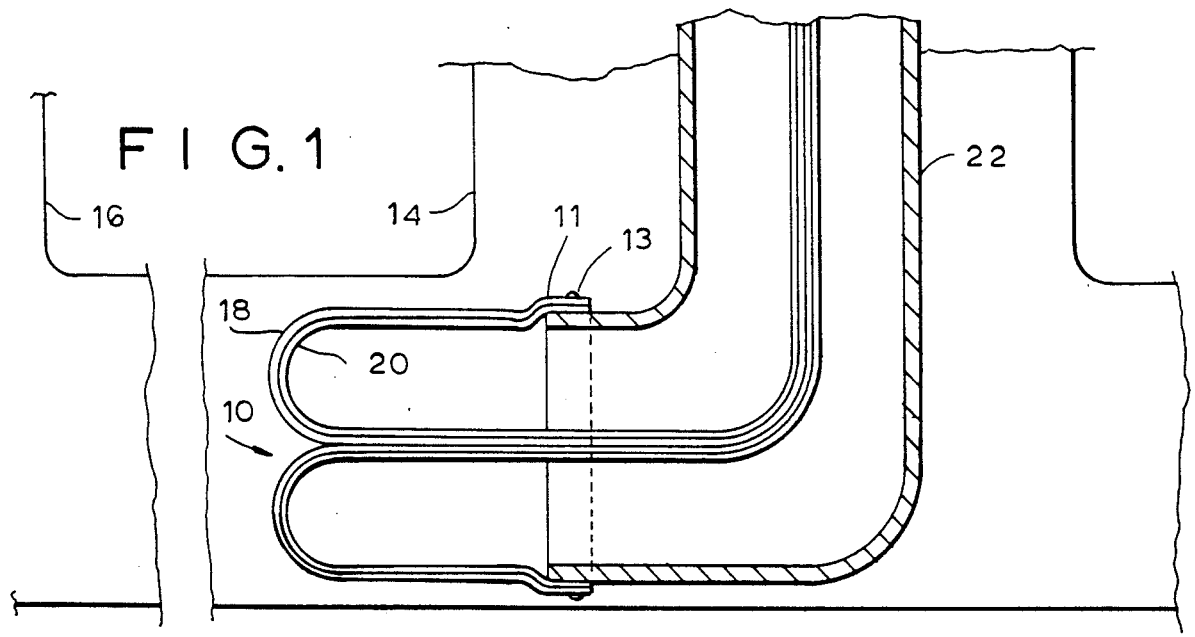

FIG. 1 discloses diagrammatically how a lining, generally designated 10, is applied to an underground pipeline between two manholes 14 and 16. The lining 10 is in the form of a tube formed of a flexible material comprising, prior to insertion in the pipeline 12, an inner felt or other resin-absorbent material 18 preferably surrounded by a fluid-impermeable membrane 20 normally bonded to the felt layer 18 and usually constituted by a synthetic plastic film. The felt layer 18 is impregnated with a suitable curable synthetic resin which makes the lining of considerable weight while still flexible. To insert the lining 10 into the pipe 12 a leading end 11 of the lining 10 is inserted through a feed elbow 22 and the leading end 11 is turned back upon itself and fixed to the lower end of the feed elbow, as at 13. Water or other fluid is then forced into the feed elbow 22 which causes the lining tube 10 to evert into and along the interior of the pipe 12. As a result the resin-impregnated felt layer 18 becomes the outer layer while the fluid-impermeable layer 20 becomes the inner layer. The fluid which everts the lining tube 10 also exerts a radial pressure on the interior of the lining, expanding it and pressing it against the inner surface of the pipe 12. The lining is maintained in engagement with the pipe 12 until the resin which impregnates the felt layer 18 cures. That curing may be effected by any suitable means, such as through the use of heated water, induction heating, or high frequency ultrasonics. After the resin cure has been completed the fluid is removed from inside the lining 10, thus leaving a hard, rigid lining applied to the pipeline surface.

In the past the layer 18 has frequently been formed of a heavily needled felt of polyester or acrylic fibers, the needling causing those fibers to extend by and large in a direction at right angles to the plane of the material. As a result the tensile strength of the material, even after the absorbed resin has hardened, is not as great as might be desired, thus making the hardened lining subject to such distortions as buckling and ovality.

In accordance with the present invention one or more reinforcing layers 24 are incorporated into the felt layer 18, those reinforcing layers being characterized by fibers which extend in the plane of the layer 24 and preferably primarily in one direction in that plane, and when the layers 24 are incorporated into the felt layer 18 they are so oriented that their fibers extend in the direction of the forces to be resisted. In the case of tubular liners used for the lining of pipes the reinforcing fibers may extend circumferentially of the lining tube, thus contrasting with the fibers of the felt layer 18, which by and large extend radially of the tube.

Figure 2:
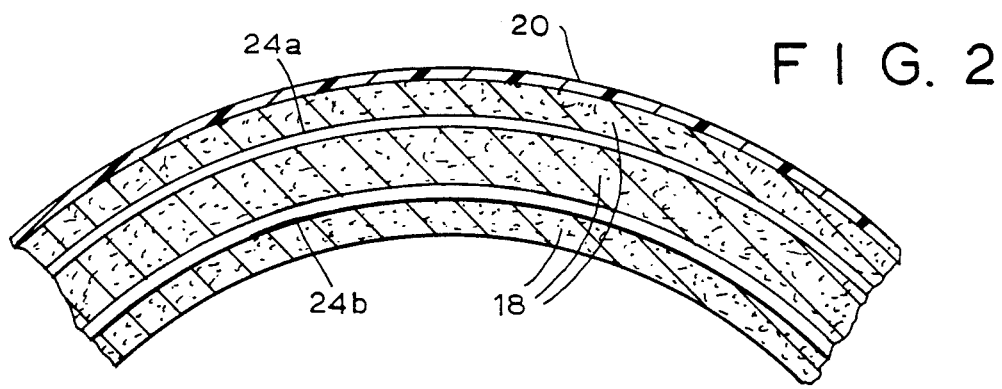
FIG. 2, is an enlarged cross-sectional view of a segment of a typical lining of the present invention after it has been formed in situ.

The fibers of the reinforcing layer 24 may comprise high strength synthetic fibers such as the polyamide sold by duPont under the name "Kevlar", they may be high tenacity polypropylene fibers or carbon fibers, or any mixture of these fibers or other suitable high strength fibers to impart to the lining the desired increased tensile strength without a corresponding increase in the material bulk. As may be seen from FIG. 2, the reinforcing layers 24 preferably are of substantially less thickness than the felt layer 18.

Figure 3:
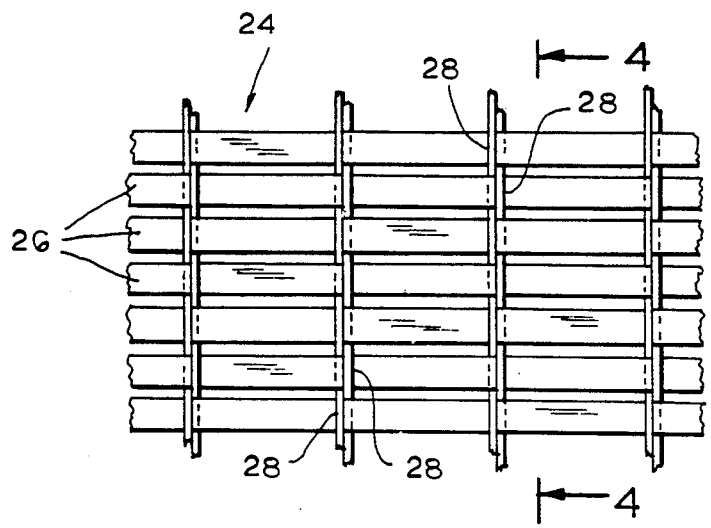
FIG. 3 is top plan view of a sheet usable as a preferred reinforcing layer.

A particularly effective fabric for constituting a reinforcing layer 24 is the type of sheet shown in FIGS. 3 and 4. It comprises a plurality of closely spaced parallel strands 26 of appreciable length bound together by means of threads 28 to form a self-sustaining and readily manipulatable sheet. Each strand 26, which may have a diameter of approximately 1/16", is itself formed of a large number of discrete thin fibers 30 (see FIG. 4) of appropriate composition, such as the Kevlar previously referred to.

The reinforcing layers 24 are inserted between sections of the felt layer 18 and are bonded to the felt in any appropriate manner, such as light needling of the felt, spin bonding, stitch bonding or adhesive bonding. The method of bonding should be such as not to inhibit the impregnation of the layers with the curable synthetic resin, that impregnation preferably being carried out after the composite lining material has been formed.

The reinforcing layer 24 may also be a knitted or woven layer or a combination of several layers of similar or different construction.

Having reference now to FIGS. 5-9, FIG. 5 diagrammatically represents a lining of the present invention, with the reinforcing layers 24 being diagrammatically illustrated by broken lines. Two such layers are disclosed in FIG. 2 and in FIGS. 5 and 9, the layer 24a being located relatively close to the radially outer surface of the tube formed by the lining and the layer 24b being located relatively close to the radially inner surface of that tube. The arrows 30 of FIG. 5 represent external pressure on the lining after it has been formed in situ within the pipe. Typically such pressure can result when a deep-laid pipe is acted upon by a significant head of ground water.

It will be apparent that the pressure 30 tends to cause the lining to depart from its optimum circular cross-section, and that that tendency is resisted by the tensile strength of the hardened lining, and primarily, for the particular problem here used for illustration, its tensile strength in the direction of the circumference of the tube formed by the lining. As has been pointed out, because the fibers of the felt layer 18 are by and large oriented in the direction of the radius of the lining tube, they and the hardened resin do not have an optimal tensile strength in the circumferential direction. However, because the fibers of the reinforcing layer 24 extend in the circumferential direction, they do produce a significantly great tensile strength in that direction. This is particularly the case when the individual fibers of that reinforcing layer 24 extend for substantially the full circumferential length, a situation readily achievable when a reinforcing lining material of the type shown in FIGS. 3 and 4 is utilized.

When the forces exerted on the tubular lining are such as to cause a segment of the lining to buckle, as shown in FIG. 6, different portions of the thickness of the lining are differently affected, as is illustrated in FIG. 7. The lining adjacent the inner surface of the tube tends to be stretched while the lining adjacent the outer surface of the tube tends to contract. Hence a reinforcing layer 24b located adjacent the inner surface of the tube will resist the stretching at its location, and hence will inhibit buckling, whereas the reinforcing layer 24a adjacent the outer surface of the tube has little or no effect. Conversely, as may be seen from FIGS. 8 and 9, when the tubular lining of normally circular cross-section is distorted to an oval shape that portion of the lining adjacent its inner surface is compressed and that portion of the lining adjacent its outer surface is stretched, just the opposite of what occurs in the case of buckling. Hence when there is a tendency toward ovality it is the reinforcing layer 24a adjacent the outer surface of the tube which exerts its tensile strength and inhibits ovality while the reinforcing layer 24b adjacent the inner surface of the tubular lining has little or no effect. From this it is seen that the location of the reinforcing layer 24 with respect to the thickness of the felt layer 18 may be varied depending upon the particular problem to be alleviated. When a standard lining is to be provided to resist either buckling or ovality or both, then the arrangement here specifically shown, with reinforcing layers 24a and 24b located respectively close to the outer and inner surfaces of the tubular lining, may be provided.

While reinforcing layers 24 with fibers extending generally circumferentially of the tubular lining have been here disclosed, since that orientation is particularly effective in inhibiting buckling or ovality, it will be understood that the fibers of the reinforcing layer 24, or some of them, could be longitudinally oriented or otherwise oriented, depending upon the direction of the exerted forces which are to be nullified. An orientation of the reinforcing layer fibers at a 55° angle with respect to the longitudinal axis of the lining tube provides an effective compromise between enhancing circumferential tensile strength and longitudinal tensile strength.

One reason that a polyamide fiber such as Kevlar is particularly effective is that it has a specific gravity of approximately 1.3, closely the same as that of the felt fibers which make up the layer 18, so that the presence of those fibers in the lining does not detract from the ease with which the lining may be inserted and manipulated through the use of water, as taught in the aforementioned '211 patent. Were materials of a greater specific gravity, for example, glass fibers, to be employed, the effective weight of the lining in the water carrier would be greater and it would therefore be more difficult to put into place.

It has been found with the practice of the present invention that reinforcing fibers oriented in a generally circumferential direction with respect to the lining tube multiplies the tensile strength of the lining in that direction by several times compared to an otherwise equivalent lining material containing only transverse fiber layers. For example, a typical hardened lining without the reinforcing layer 24 has a flexural modulus of 300,000 psi, but a comparable lining with two Kevlar reinforcing layers 24 has a flexural modulus of 1,000,000 psi.

While but a limited number of embodiments have been here described, it will be apparent that many variations may be made therein, all without departing from the spirit of the invention as defined in the following claims.

I claim:

1. A conduit lining impregnated with a settable resin and flexible so as to be insertable into a pipe and then by internal pressure to be urged against the inner surface of said pipe and then rigidifiable in situ through the setting of said resin contained therein comprising a flexible and relatively thick first layer having area and thickness and comprising fibers with their lengths generally extending in the direction of said thickness and containing said settable rigidifying resin, the fibers of said first layer defining a felt, and, within said first layer, a second layer comprising elongated generally unidirectional flexible fibers of much greater length and of much higher tensile strength than the fibers of said first layer with their lengths generally extending substantially at right angles to said thickness, thereby to produce relatively great tensile strength in directions corresponding to the orientation of said elongated fibers.

2. The conduit lining of claim 1, in which said second layer is in two sections spaced from one another in the direction of the thickness of said first layer.

3. The conduit lining of claim 1, in which said first layer comprises inner and outer faces, and said second layer is closer to one of said faces than to the other.

4. The conduit lining of claim 1, in which said first layer comprises inner and outer faces, and said layer is closer to said inner face than to said outer face, thereby to inhibit buckling of said lining.

5. The conduit lining of claim 1, in which said first layer comprises inner and outer faces, and said second layer is closer to said outer face than to said inner face, thereby to inhibit ovality of said lining.

6. The conduit lining of claim 1, in which said first layer comprises inner and outer faces, and said second layer is in two sections, one closer to said inner face than to said outer face, thereby to inhibit buckling of said lining, and the other being closer to said outer face than to said inner face, thereby to inhibit ovality of said lining.

7. The conduit lining of claim 1, in which said fibers of said second layer are formed of a polyamide.

8. The conduit lining of claim 1, in which said fibers of said second layer extend in generally the same direction and are secured to one another to define a self-sustaining layer sandwiched in said first layer.

* * * * *